(12) United States Patent
Yuan et al.

(10) Patent No.: US 11,375,154 B2
(45) Date of Patent: Jun. 28, 2022

(54) METHOD AND APPARATUS FOR PROCESSING HIGH DYNAMIC RANGE VIDEO INCLUDING SUBTITLE

(71) Applicant: Huawei Technologies Co., Ltd., Shenzhen (CN)

(72) Inventors: Le Yuan, Shenzhen (CN); Zheng Wang, Shenzhen (CN); Renjian Wu, Shenzhen (CN); Fang Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/108,375

(22) Filed: Dec. 1, 2020

(65) Prior Publication Data

US 2021/0084257 A1    Mar. 18, 2021

Related U.S. Application Data

(63) Continuation of application No. PCT/CN2018/092630, filed on Jun. 25, 2018.

(51) Int. Cl.
*H04N 7/088* (2006.01)
*H04N 5/272* (2006.01)
(Continued)

(52) U.S. Cl.
CPC .......... *H04N 7/0885* (2013.01); *G06T 5/009* (2013.01); *H04N 5/272* (2013.01); *H04N 5/278* (2013.01);
(Continued)

(58) Field of Classification Search
CPC .......... G06T 2207/20208; G06T 2207/10016; G09G 2360/16; H04N 5/272; H04N 5/278; H04N 5/57; H04N 7/0885
See application file for complete search history.

(56) References Cited

U.S. PATENT DOCUMENTS 7,373,650 B1 * 5/2008 Rodriguez ......... H04N 5/44591
                                                    725/41
7,565,680 B1 * 7/2009 Asmussen ......... H04N 21/4223
                                                    725/135
(Continued)

FOREIGN PATENT DOCUMENTS

CN    103597812 A    2/2014
CN    105009567 A    10/2015
(Continued)

*Primary Examiner* — Paulos M Natnael
(74) *Attorney, Agent, or Firm* — Conley Rose, P.C.

(57) ABSTRACT

A method and an apparatus for processing a high dynamic range (HDR) video including a subtitle, where the method includes: encapsulating HDR video data into a video data frame that matches a transmission interface; encapsulating subtitle information into a subtitle information frame that matches the transmission interface; and separately transmitting the video data frame and the subtitle information frame to a display device through the transmission interface, where the video data frame and the subtitle information frame are packets in two types of formats. According to the method provided in this application, content and subtitle information of a dynamic metadata HDR video are separately transmitted to the display device. In this way, the display device can obtain the separated video content and subtitle information, and then separately perform corresponding processing on the HDR video and a subtitle.

18 Claims, 9 Drawing Sheets

(51) Int. Cl.
  *H04N 5/278* (2006.01)
  *G06T 5/00* (2006.01)
  *H04N 7/035* (2006.01)
  *H04N 21/235* (2011.01)

(52) U.S. Cl.
  CPC ........... *H04N 7/035* (2013.01); *H04N 21/235* (2013.01); *G06T 2207/10016* (2013.01); *G06T 2207/20208* (2013.01); *G06T 2207/20212* (2013.01)

(56) References Cited

U.S. PATENT DOCUMENTS

| | | | |
|---|---|---|---|
| 2006/0287915 A1* | 12/2006 | Boulet | H04L 12/14 705/14.61 |
| 2009/0213924 A1* | 8/2009 | Sun | H04N 5/91 375/240.01 |
| 2012/0019716 A1 | 1/2012 | Blanchard | |
| 2014/0044372 A1* | 2/2014 | Mertens | H04N 19/98 382/248 |
| 2014/0125696 A1 | 5/2014 | Newton et al. | |
| 2015/0103919 A1* | 4/2015 | Hattori | H04N 19/70 375/240.25 |
| 2015/0208024 A1* | 7/2015 | Takahashi | H04N 21/8543 386/353 |
| 2015/0208102 A1* | 7/2015 | Takahashi | H04N 5/76 348/441 |
| 2016/0027160 A1 | 1/2016 | Aydin et al. | |
| 2016/0100183 A1* | 4/2016 | Yamamoto | H04N 5/76 386/230 |
| 2016/0142746 A1* | 5/2016 | Schuberth | H04N 21/2146 725/31 |
| 2016/0261665 A1* | 9/2016 | Stockhammer | H04N 21/8456 |
| 2017/0200464 A1 | 7/2017 | Yahata et al. | |
| 2017/0352374 A1* | 12/2017 | Takahashi | H04N 9/8205 |
| 2017/0374313 A1* | 12/2017 | Oh | H04N 21/4348 |
| 2018/0007363 A1* | 1/2018 | Oh | H04N 19/85 |
| 2018/0270512 A1 | 9/2018 | Tsukagoshi | |
| 2018/0322679 A1 | 11/2018 | Kunkel et al. | |
| 2019/0007709 A1* | 1/2019 | Oh | H04N 21/2353 |

FOREIGN PATENT DOCUMENTS

| | | |
|---|---|---|
| CN | 106663453 A | 5/2017 |
| CN | 107211169 A | 9/2017 |
| EP | 2388688 A1 | 11/2011 |
| EP | 3038352 A1 | 6/2016 |

* cited by examiner

METHOD AND APPARATUS FOR PROCESSING HIGH DYNAMIC RANGE VIDEO INCLUDING SUBTITLE

CROSS-REFERENCE TO RELATED APPLICATIONS

This application is a continuation of International Patent Application No. PCT/CN2018/092630, filed on Jun. 25, 2018, the disclosure of which is hereby incorporated by reference in its entirety.

TECHNICAL FIELD

This application relates to the field of multimedia communication, and in particular, to a method and an apparatus for processing a high dynamic range video including a subtitle.

BACKGROUND

A high dynamic range (HDR) video technology expands a luminance range of an image that can be displayed, such that information in a relatively large luminance range can be recorded, and more details in bright and dark regions can be presented. Forms of metadata used to describe an HDR video feature include a static metadata HDR video and a dynamic metadata HDR video. Both the static metadata HDR video and the dynamic metadata HDR video can be correctly presented on a screen only after tone mapping is performed on a video signal source featured by a wide dynamic range. For the static metadata HDR video, a fixed mapping method is used to process all images, and a mapping manner does not vary with a change in a video image. For the dynamic metadata HDR video, a mapping method is dynamically adjusted based on a change in image content, such that images in various luminance ranges can be optimally displayed and presented.

A subtitle plays an important role in assisting a subscriber in watching a program. Almost all types of TV programs, such as TV series, movies, and variety shows, are provided with subtitles. In addition, a bullet screen subtitle is becoming popular. When a subscriber watches a dynamic metadata HDR video, a display effect of a subtitle greatly affects user experience. However, the dynamic metadata HDR video does not describe subtitle content. A subtitle display effect is poor if an existing video processing method is used to process a dynamic metadata HDR video including a subtitle.

SUMMARY

Embodiments of this application provide a method and an apparatus for processing a high dynamic range video including a subtitle, to improve a subtitle display effect of a dynamic metadata HDR video.

A first aspect of this application provides a method for processing a high dynamic range video including a subtitle. The method includes: encapsulating HDR video data into a video data frame that matches a transmission interface; encapsulating subtitle information into a subtitle information frame that matches the transmission interface; and separately transmitting the video data frame and the subtitle information frame to a display device through the transmission interface, where the video data frame and the subtitle information frame are packets in two types of formats.

According to the video processing method provided in this application, content and subtitle information of a dynamic metadata HDR video are separately transmitted to the display device. In this way, the display device can obtain the separated video content and subtitle information, and then separately perform corresponding processing on the HDR video and a subtitle. This improves a subtitle display effect of the dynamic metadata HDR video.

In a possible implementation, the separately transmitting the video data frame and the subtitle information frame to a display device through the transmission interface includes: transmitting the video data frame and the subtitle information frame to the display device through the transmission interface in a time-division manner.

In a possible implementation, the transmission interface corresponds to a plurality of transmission frequency bands, and the video data frame and the subtitle information frame are transmitted through the transmission interface in a frequency-division manner.

In a possible implementation, the transmission interface corresponds to a plurality of transmission channels, and the video data frame and the subtitle information frame are transmitted through the transmission interface in a channel-division manner.

In a possible implementation, the subtitle information frame is transmitted within a vertical blanking, and the vertical blanking is a time interval at which two adjacent video data frames are transmitted.

Two video data frames are sent at a time interval. The time interval may be used to transmit information other than video data, for example, audio information and metadata information. The transmission interface can provide very high bandwidth for transmitting audio and video information, and an information mount of the subtitle information is far less than an information amount of the video data. Therefore, the time interval between the video data frames is sufficient for transmitting the subtitle information frame.

In a possible implementation, video data frames are sequentially transmitted through the transmission interface in chronological order, where an $N^{th}$ video data frame is transmitted in an $N^{th}$ timeslot, a subtitle information frame corresponding to the $N^{th}$ video data frame is transmitted within a vertical blanking of the $N^{th}$ timeslot, and N is a positive integer.

A subtitle information frame and a video data frame corresponding to the subtitle information frame are transmitted in a same timeslot. This can ensure synchronization between a video image and a subtitle.

In a possible implementation, a correspondence between a subtitle information frame and a video data frame is preset, and the video data frame and the subtitle information frame are transmitted based on the preset correspondence in the time-division manner.

The correspondence between a subtitle information frame and a video data frame is preset, and the subtitle information frame and the video data frame are sent based on the preset correspondence. This can ensure synchronization between the video image and the subtitle.

In a possible implementation, the subtitle information frame includes at least one of a type identification field or a plurality of valid subtitle information payload bytes.

In a possible implementation, the subtitle information frame further includes at least one of a version identification field or a length identification field, and a value of the length identification field is related to a quantity of the plurality of valid subtitle information payload bytes.

The version identifier field facilitates subsequent development and improvement of a subtitle information frame based on the encapsulation format. For example, a subtitle information frame format first launched is an initial version, and a new field is subsequently added to satisfy a new requirement. In this case, a version 2, a version 3, and the like may be provided. This field is used to indicate a version of a current information frame, such that a playing device and the display device perform corresponding processing based on different subtitle information frame versions. The length identification field is used to indicate a length of a to-be-transmitted subtitle information frame, to help preliminarily determine a size of the subtitle information frame, adjust a quantity of bytes occupied for transmitting the subtitle information frame, and improve flexibility of subtitle processing.

In a possible implementation, valid subtitle information included in the plurality of valid subtitle information payload bytes includes at least one of subtitle text content, a codeword corresponding to the subtitle text content, or subtitle drawing control information.

In a possible implementation, the subtitle drawing control information includes at least one of a font, a size, a color, a position, an aspect ratio, transparency, color gamut information, or a bit depth of a subtitle.

In a possible implementation, the plurality of valid subtitle information payload bytes include a valid information flag byte, and the valid information flag byte is used to limit respective identification content of another valid subtitle information payload byte.

In a possible implementation, the transmission interface is a high-definition multimedia interface (HDMI).

In a possible implementation, the method further includes: receiving a transport stream, where the transport stream includes the HDR video data, the subtitle information, and metadata, and the metadata includes a mapping relationship for performing tone mapping on the HDR video data.

In a possible implementation, the method further includes: encapsulating the metadata into a metadata information frame that matches the transmission interface; and transmitting, within the vertical blanking of the $N^{th}$ timeslot, a metadata information frame corresponding to the $N^{th}$ video data frame.

In a possible implementation, the subtitle information frame is transmitted before or after the metadata.

A second aspect of this application provides a method for processing a high dynamic range video including a subtitle. The method includes: separately receiving, through a transmission interface, a video data frame and a subtitle information frame that are transmitted from a playing device; decapsulating the video data frame to obtain HDR video data; decapsulating the subtitle information frame to obtain subtitle information; separately performing tone mapping on the HDR video data and a subtitle image, where the subtitle image is drawn based on the subtitle information; and overlaying HDR video data obtained after tone mapping and a subtitle image obtained after tone mapping, to obtain a video image including a subtitle.

In a possible implementation, the separately receiving, through a transmission interface, a video data frame and a subtitle information frame that are transmitted from a playing device includes: receiving, through the transmission interface in a time-division manner, the video data frame and the subtitle information frame that are transmitted from the playing device.

In a possible implementation, the subtitle information frame is transmitted within a vertical blanking, and the vertical blanking is a time interval at which two adjacent video data frames are transmitted.

Two video data frames are sent at a time interval. The time interval may be used to transmit information other than video data, for example, audio information and metadata information. The transmission interface can provide very high bandwidth for transmitting audio and video information, and an information mount of the subtitle information is far less than an information amount of the video data. Therefore, the time interval between the video data frames is sufficient for transmitting the subtitle information frame.

In a possible implementation, video data frames are sequentially transmitted through the transmission interface in chronological order, where an $N^{th}$ video data frame is transmitted in an $N^{th}$ timeslot, a subtitle information frame corresponding to the $N^{th}$ video data frame is transmitted within a vertical blanking of the $N^{th}$ timeslot, and N is a positive integer.

A subtitle information frame and a video data frame corresponding to the subtitle information frame are transmitted in a same timeslot. This can ensure synchronization between a video image and a subtitle.

In a possible implementation, a correspondence between a subtitle information frame and a video data frame is preset, and the video data frame and the subtitle information frame are transmitted based on the preset correspondence in the time-division manner.

The correspondence between a subtitle information frame and a video data frame is preset, and the subtitle information frame and the video data frame are sent based on the preset correspondence. This can ensure synchronization between the video image and the subtitle.

In a possible implementation, the subtitle information frame includes at least one of a type identification field or a plurality of valid subtitle information payload bytes.

In a possible implementation, the subtitle information frame further includes at least one of a version identification field or a length identification field, and a value of the length identification field is related to a quantity of the plurality of valid subtitle information payload bytes.

In a possible implementation, valid subtitle information included in the plurality of valid subtitle information payload bytes includes at least one of subtitle text content, a codeword corresponding to the subtitle text content, or subtitle drawing control information.

In a possible implementation, the subtitle drawing control information includes at least one of a font, a size, a color, a position, an aspect ratio, transparency, color gamut information, or a bit depth of a subtitle.

In a possible implementation, the plurality of valid subtitle information payload bytes include a valid information flag byte, and the valid information flag byte is used to limit respective identification content of another valid subtitle information payload byte.

In a possible implementation, the transmission interface corresponds to a plurality of transmission frequency bands, and the separately receiving, through a transmission interface, a video data frame and a subtitle information frame that are transmitted from a playing device includes: receiving, through the transmission interface in a frequency-division manner, the video data frame and the subtitle information frame that are transmitted from the playing device. Alternatively, the transmission interface corresponds to a plurality of transmission channels, and the separately receiving, through a transmission interface, a video data frame and a subtitle information frame that are transmitted from a playing device includes: receiving, through the transmission interface in a channel-division manner, the video data frame and the subtitle information frame that are transmitted from the playing device.

In a possible implementation, the method further includes: receiving a metadata information frame through the transmission interface; and decapsulating the metadata information frame to obtain metadata, where the metadata includes a mapping relationship for performing tone mapping on the HDR video data. Additionally, the separately performing tone mapping on the HDR video data and a subtitle image includes: performing tone mapping on the HDR video data based on the metadata; and performing tone mapping on the subtitle image based on a range of luminance that can be displayed by a display device.

In a possible implementation, the transmission interface is a high-definition multimedia interface (HDMI).

A third aspect of this application provides an apparatus for playing a high dynamic range video including a subtitle. The apparatus includes a processor and a transmission interface. The processor is configured to implement the following operations: encapsulating HDR video data into a video data frame that matches the transmission interface; and encapsulating subtitle information into a subtitle information frame that matches the transmission interface. The transmission interface is configured to separately transmit the video data frame and the subtitle information frame to a display device, where the video data frame and the subtitle information frame are packets in two types of formats.

In a possible implementation, the transmission interface is configured to transmit the video data frame and the subtitle information frame to the display device in a time-division manner.

In a possible implementation, the subtitle information frame is transmitted within a vertical blanking, and the vertical blanking is a time interval at which two adjacent video data frames are transmitted.

Two video data frames are sent at a time interval. The time interval may be used to transmit information other than video data, for example, audio information and metadata information. The transmission interface can provide very high bandwidth for transmitting audio and video information, and an information mount of the subtitle information is far less than an information amount of the video data. Therefore, the time interval between the video data frames is sufficient for transmitting the subtitle information frame.

In a possible implementation, video data frames are sequentially transmitted through the transmission interface in chronological order, where an $N^{th}$ video data frame is transmitted in an $N^{th}$ timeslot, a subtitle information frame corresponding to the $N^{th}$ video data frame is transmitted within a vertical blanking of the $N^{th}$ timeslot, and N is a positive integer.

A subtitle information frame and a video data frame corresponding to the subtitle information frame are transmitted in a same timeslot. This can ensure synchronization between a video image and a subtitle.

In a possible implementation, a correspondence between a subtitle information frame and a video data frame is preset, and the video data frame and the subtitle information frame are transmitted based on the preset correspondence in the time-division manner.

The correspondence between a subtitle information frame and a video data frame is preset, and the subtitle information frame and the video data frame are sent based on the preset correspondence. This can ensure synchronization between the video image and the subtitle.

In a possible implementation, the subtitle information frame includes at least one of a type identification field or a plurality of valid subtitle information payload bytes.

In a possible implementation, the subtitle information frame further includes at least one of a version identification field or a length identification field, and a value of the length identification field is related to a quantity of the plurality of valid subtitle information payload bytes.

In a possible implementation, valid subtitle information included in the plurality of valid subtitle information payload bytes includes at least one of subtitle text content, a codeword corresponding to the subtitle text content, or subtitle drawing control information.

In a possible implementation, the transmission interface is configured to transmit the video data frame and the subtitle information frame to the display device in a frequency-division manner or in a channel-division manner.

In a possible implementation, the transmission interface is a high-definition multimedia interface (HDMI).

In a possible implementation, the transmission interface is an HDMI transmitter.

In a possible implementation, the apparatus further includes: a receiving interface configured to receive a transport stream. The transport stream includes the HDR video data, the subtitle information, and metadata, where the metadata includes a mapping relationship for performing tone mapping on the HDR video data.

In a possible implementation, the processor is further configured to encapsulate the metadata into a metadata information frame that matches the transmission interface. The transmission interface is configured to transmit, within the vertical blanking of the $N^{th}$ timeslot, a metadata information frame corresponding to the $N^{th}$ video data frame to the display device.

In a possible implementation, the apparatus further includes a memory. The memory is configured to store a program instruction, and the program instruction is used to drive the processor to perform the foregoing operations.

In a possible implementation, the memory includes at least one of a computer-readable storage medium, a floppy disk device, a hard disk device, an optical disc device, or a magnetic disk device.

In a possible implementation, the processor is further configured to perform the method described in any possible implementation of the first aspect.

A fourth aspect of this application provides an apparatus for displaying a high dynamic range video including a subtitle. The apparatus includes: a receiving interface and a processor. The receiving interface is configured to separately receive a video data frame and a subtitle information frame that are transmitted from a playing device. The processor is configured to: decapsulate the video data frame to obtain HDR video data; decapsulate the subtitle information frame to obtain subtitle information; separately perform tone mapping on the HDR video data and a subtitle image, where the subtitle image is drawn based on the subtitle information; and overlay HDR video data obtained after tone mapping and a subtitle image obtained after tone mapping, to obtain a video image including a subtitle.

In a possible implementation, the receiving interface is configured to receive, in a time-division manner, the video data frame and the subtitle information frame that are transmitted from the playing device.

In a possible implementation, the subtitle information frame is transmitted within a vertical blanking, and the vertical blanking is a time interval at which two adjacent video data frames are transmitted.

In a possible implementation, video data frames are sequentially received through the receiving interface in chronological order, where an $N^{th}$ video data frame is transmitted in an $N^{th}$ timeslot, a subtitle information frame corresponding to the $N^{th}$ video data frame is transmitted within a vertical blanking of the $N^{th}$ timeslot, and N is a positive integer.

In a possible implementation, the receiving interface is a high-definition multimedia interface (HDMI).

In a possible implementation, the receiving interface is an HDMI receiver.

In a possible implementation, the apparatus further includes a memory. The memory is configured to store a program instruction, and the program instruction is used to drive the processor to perform the foregoing operations.

In a possible implementation, the memory includes at least one of a computer-readable storage medium, a floppy disk device, a hard disk device, an optical disc device, or a magnetic disk device.

In a possible implementation, the processor is further configured to perform the method described in any possible implementation of the second aspect.

A fifth aspect of this application provides an apparatus for playing a high dynamic range video including a subtitle. The apparatus includes: an encapsulation module configured to encapsulate HDR video data into a video data frame that matches a transmission interface, where the encapsulation module is further configured to encapsulate subtitle information into a subtitle information frame that matches the transmission interface; and a transmission module configured to separately transmit the video data frame and the subtitle information frame to a display device through the transmission interface, where the video data frame and the subtitle information frame are packets in two types of formats.

In a possible implementation, the separately transmitting the video data frame and the subtitle information frame to a display device through the transmission interface includes: transmitting the video data frame and the subtitle information frame to the display device through the transmission interface in a time-division manner.

In a possible implementation, the transmission interface corresponds to a plurality of transmission frequency bands, and the video data frame and the subtitle information frame are transmitted through the transmission interface in a frequency-division manner.

In a possible implementation, the transmission interface corresponds to a plurality of transmission channels, and the video data frame and the subtitle information frame are transmitted through the transmission interface in a channel-division manner.

In a possible implementation, the transmission interface is a high-definition multimedia interface (HDMI).

In a possible implementation, the apparatus further includes: a receiving module configured to receive a transport stream. The transport stream includes the HDR video data, the subtitle information, and metadata, where the metadata includes a mapping relationship for performing tone mapping on the HDR video data.

In a possible implementation, the encapsulation module is further configured to: encapsulate the metadata into a metadata information frame that matches the transmission interface; and transmit, within a vertical blanking of an $N^{th}$ timeslot, a metadata information frame corresponding to an $N^{th}$ video data frame.

In a possible implementation, the subtitle information frame is transmitted before or after the metadata.

A sixth aspect of this application provides an apparatus for displaying a high dynamic range video including a subtitle. The apparatus includes: a receiving module configured to separately receive, through a transmission interface, a video data frame and a subtitle information frame that are transmitted from a playing device; a decapsulation module configured to decapsulate the video data frame to obtain HDR video data, where the decapsulation module is further configured to decapsulate the subtitle information frame to obtain subtitle information; a processing module configured to separately perform tone mapping on the HDR video data and a subtitle image, where the subtitle image is drawn based on the subtitle information; and an overlaying module configured to overlay HDR video data obtained after tone mapping and a subtitle image obtained after tone mapping, to obtain a video image including a subtitle.

In a possible implementation, the apparatus further includes: a receiving module configured to receive a metadata information frame through the transmission interface. The decapsulation module is further configured to decapsulate the metadata information frame to obtain metadata, where the metadata includes a mapping relationship for performing tone mapping on the HDR video data. The processing module is configured to perform tone mapping on the HDR video data based on the metadata. The processing module is further configured to perform tone mapping on the subtitle image based on a range of luminance that can be displayed by a display device.

In a possible implementation, the transmission interface is a high-definition multimedia interface (HDMI).

A seventh aspect of this application provides a system for processing a high dynamic range video including a subtitle. The system includes a playing apparatus and a display apparatus. The playing apparatus is the playing apparatus described in any one of the first aspect, the fifth aspect, or the possible implementations of the third or the fifth aspect. The display apparatus is the display apparatus described in any one of the fourth aspect, the sixth aspect, or the possible implementations of the fourth or the sixth aspect.

An eighth aspect of this application provides a computer-readable storage medium. The computer-readable storage medium stores an instruction. When the instruction is run on a computer or a processor, the computer or the processor is enabled to perform the method described in any one of the first aspect or the possible implementations of the first aspect.

A ninth aspect of this application provides a computer program product including an instruction. When the computer program product runs on a computer or a processor, the computer or the processor is enabled to perform the method described in any one of the first aspect or the possible implementations of the first aspect.

DESCRIPTION OF EMBODIMENTS

In the embodiments, claims, and the accompanying drawings of this specification in this application, the terms "first", "second", and the like are intended to distinguish between similar objects, but do not necessarily indicate a specific order or sequence. In addition, the terms "include", "have", and any variant thereof are intended to cover a non-exclusive inclusion, for example, include a series of steps or units. Methods, systems, products, or devices are not necessarily limited to those steps or units that are clearly listed, but may include other steps or units that are not clearly listed or inherent to such processes, methods, products, or devices.

It should be understood that, in this application, "at least one" means one or more, and "a plurality of" means two or more. The term "and/or" is used to describe an association relationship for describing associated objects, and indicates that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be singular or plural.

Figure 1:
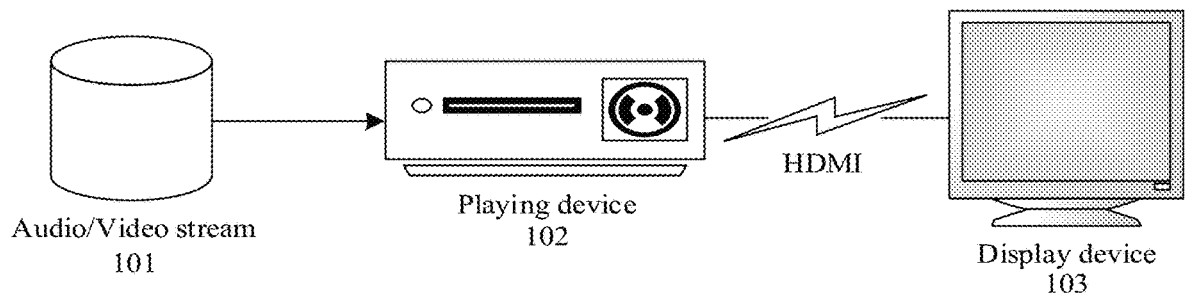
FIG. 1 is a schematic diagram of an example application scenario according to an embodiment of this application.

FIG. 1 is a schematic diagram of an example application scenario according to an embodiment of this application. In this application scenario, a playing device 102 receives and decodes an audio/video stream 101. The playing device 102 sends, through a high-definition multimedia interface (HDMI), decoded video or audio data to a display device 103 for displaying or playing. In this way, a user can enjoy video or audio content.

For example, the audio/video stream 101 may be from a website streaming medium, a remote network device, the internet, a fiber-optic network, or the like. A video stream in the audio/video stream may be dynamic metadata HDR video data or static metadata HDR video data. For example, the audio/video stream 101 may be a data stream in a transport stream (TS) format. A TS may include a video stream, an audio stream, a subtitle packet, and the like. The audio/video stream may alternatively be a data stream in another similar format. For example, the streaming medium may also use a Matroska Video File (MKV) format to encapsulate audio data, video data, subtitle data, and the like. Similarly, an audio video interleaved (AVI) format may also be used. A transport format of the audio/video stream is not limited in this application. For example, the video stream may include HDR video data and metadata used to describe an HDR video. In this case, both the metadata and the HDR video data are compressed into the video stream. Optionally, the TS may include the video stream, the audio stream, the subtitle packet, and the metadata used to describe the HDR video. In this case, the metadata used to describe the HDR video data is included in the TS and is not compressed into the video stream. The subtitle packet may include a font, a size, a color, a position, an aspect ratio, color gamut information, a bit depth, text content, and the like of a subtitle. The metadata includes a description of video image data. For example, static metadata describes a production environment of an entire video, and may include related information of a monitor used for color tuning and correction in video production, peak luminance, a black level, red-green-blue (RGB) tricolor coordinates, and white point coordinates. For example, dynamic metadata usually describes content of each frame of a video image, for example, may include maximum luminance, minimum luminance, average luminance, and the like of the image. Optionally, the dynamic metadata may further include a reference mapping curve between a frame of image and a display screen. It should be understood that the reference mapping curve included in the dynamic metadata varies with a change in the video image.

In an optional solution, the playing device 102 may be a set-top box (STB), a multimedia player, or the like. The STB mainly has many security functions, for example, charging by inserting a card, and video encryption and decryption. Some high-quality videos are protected using a digital rights protection mechanism, and can be watched on a TV only after being decrypted by the STB. Video data received by the STB is usually encoded video data. The STB further has a decoding function. Usually, the STB decodes the video data and then sends decoded video data to the TV for displaying. The following uses the STB as an example to describe an application scenario in the embodiments of this application. The STB parses a received TS to obtain video data, subtitle data, and the like. Then the STB decodes the video data and draws a subtitle. Optionally, the STB overlays video content and subtitle content, and transmits overlaid video content and subtitle content to the display device 103 through wired or wireless HDMI or display port transmission.

For example, the display device 103 may be a TV, a computer display, or any fixed or mobile terminal that has a display function. The TV displays an overlaid video and subtitle sent by the STB on a screen after performing display processing. For example, the display processing may be that the TV adjusts video luminance based on a preset tone mapping relationship, such that the video content adapts to a display capability of the TV. Optionally, when a video transmitted by the STB is an HDR video with dynamic metadata, and the TV is a TV with an HDR display function, the TV performs tone mapping on different video images based on a plurality of tone mapping relationships included in dynamic metadata, such that the different images can be optimally displayed and presented. In this application scenario, the STB overlays the video content and the subtitle content and then sends the overlaid video content and subtitle content to the TV. Therefore, the TV does not distinguish between the video and the subtitle. Instead, the TV uses a mapping method for processing the dynamic metadata HDR video, to process the overlaid video and subtitle. In a process of displaying the video content, subtitle luminance flickers.

It should be understood that, the embodiments of this application focus on displaying of a video including a subtitle. Therefore, processing of video data and subtitle data is described in detail, and processing of audio data and other data is omitted. This does not mean that the STB cannot parse and process data other than the video data and the subtitle data. The foregoing application scenario is merely for ease of description, and is not intended to limit the embodiments. The embodiments of this application may be further extended to more application scenarios of video displaying.

It should be understood that tone mapping is essentially to adjust a luminance range of a video image to a range of luminance that can be displayed on a display screen. For ease of understanding a concept of tone mapping, the following separately provides schematic diagrams of tone mapping for a static metadata HDR video and a dynamic metadata HDR video, as shown in FIG. 2.

Figure 2A:
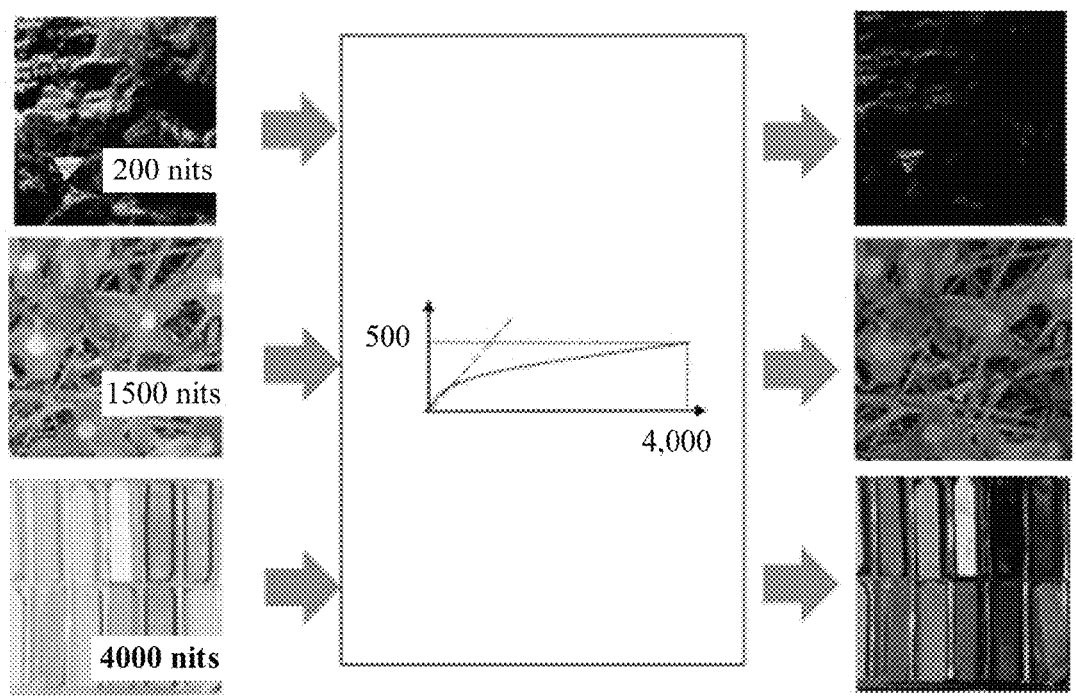
FIG. 2A is a schematic diagram of a tone mapping relationship for static metadata according to an embodiment of this application.
Figure 2B:
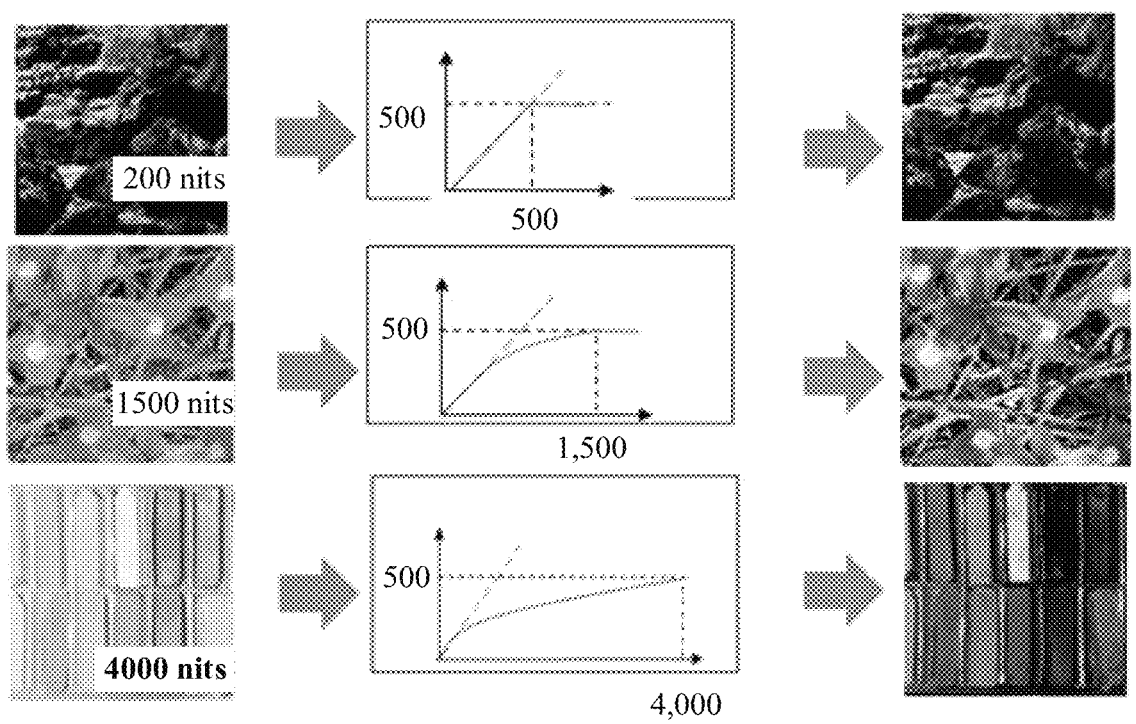
FIG. 2B is a schematic diagram of a tone mapping relationship for dynamic metadata according to an embodiment of this application.

For the static metadata HDR video, a fixed mapping method is used to process all video images. As shown in FIG. 2A, the static metadata HDR video has a fixed mapping curve. An input luminance range of the mapping curve is 0-4000 nits, and an output luminance of the mapping curve is 0-500 nits. The TV uses the mapping curve to perform tone mapping on all three frames of images whose maximum luminance is 200 nits, 1500 nits, and 4000 nits respectively, and displays processed images on a display. Actual luminance ranges of the first two frames of images do not satisfy the mapping relationship. As a result, most details of the first two frames of images are lost, the entire image is dark, and a display effect is poor. The dynamic metadata HDR video has a plurality of mapping curves. In a process of displaying a video image, a mapping curve is used based on actual luminance of the image. FIG. 2B shows three different mapping curves. An input luminance range of a mapping curve 1 is 0-500 nits, and an output luminance range of the mapping curve 1 is 0-500 nits. An input luminance range of a mapping curve 2 is 0-1500 nits, and an output luminance range of the mapping curve 2 is 0-500 nits. An input luminance range of a mapping curve 3 is 0-4000 nits, and an output luminance range of the mapping curve 3 is 0-500 nits. The TV selects, based on an actual luminance range of an image frame, a proper mapping curve to perform tone mapping. In this way, images with different luminance can be optimally presented on the screen. For example, the mapping curve 2 is selected to perform tone mapping on an image with highest luminance of 1500 nits, and a processed image retains image details. It should be understood that input luminance of the mapping curve is luminance represented by a video signal source, and output luminance of the mapping curve is luminance that can be actually displayed by the display device such as the TV. For the HDR video, a luminance range represented by a video signal produced in a professional film production environment is usually greater than a range of luminance that can be displayed by a consumer TV set. Tone mapping is a technology for mapping a luminance range of an input video signal to a range of luminance displayed by the display device.

Figure 3:
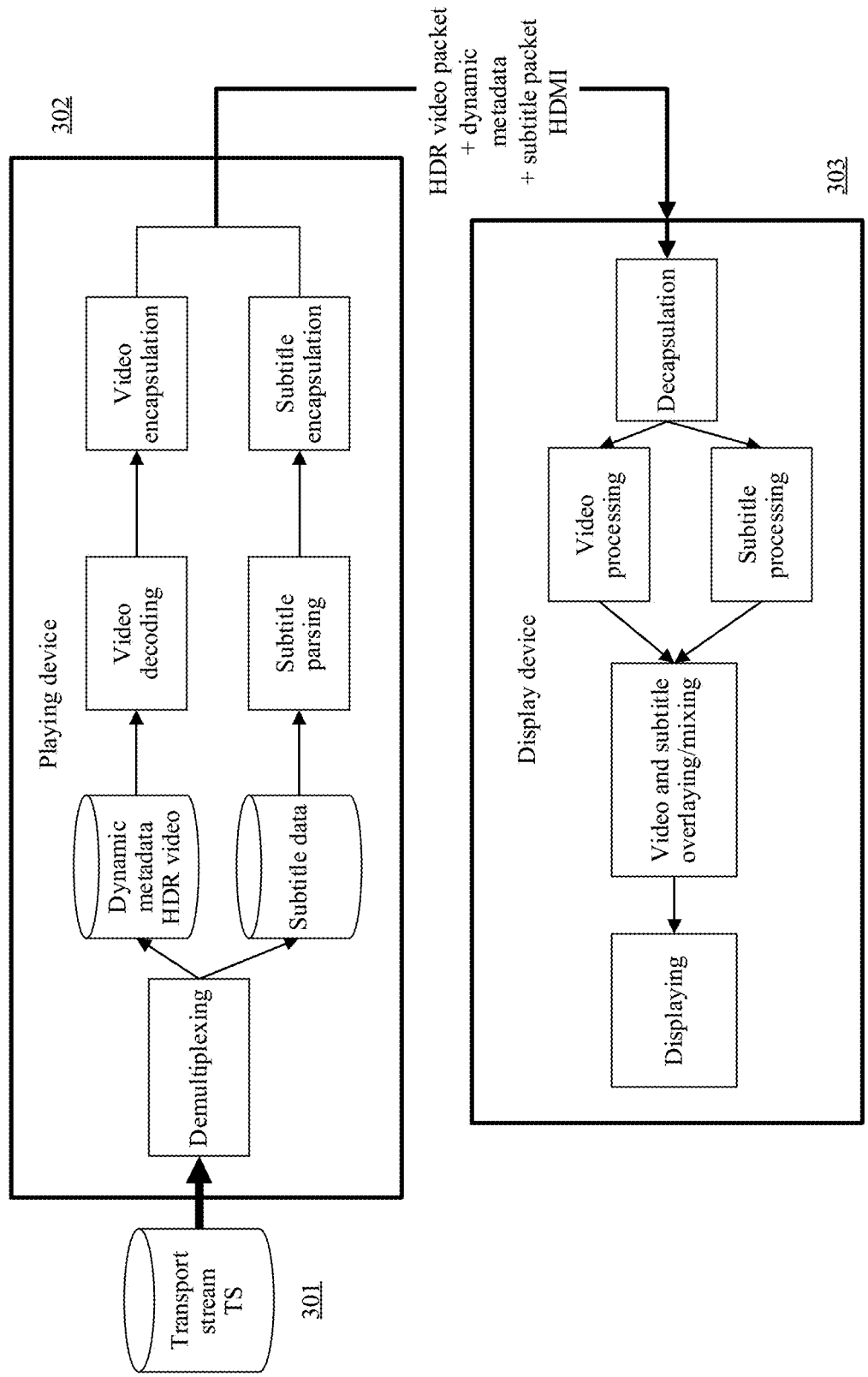
FIG. 3 is a schematic diagram of a framework of a video playing system according to an embodiment of this application.

FIG. 3 is a schematic diagram of a framework of a video display system according to an embodiment of this application. A playing device 302 includes a demultiplexing module, a video decoding module, a subtitle parsing module, and an encapsulation module. The encapsulation module separately encapsulates video data and subtitle data. A display device 303 includes a decapsulation module, a video processing module, a subtitle processing module, a video and subtitle overlaying module (or may be referred to as a video and subtitle mixing module), a display module, and the like. It should be understood that, in this embodiment of this application, the playing device and the display device are functionally divided. In actual implementation, there may be another division manner. For example, a plurality of modules may be combined or integrated into another system. Coupling between the modules may be implemented through some interfaces. These interfaces are usually electrical communications interfaces, but may alternatively be mechanical interfaces or interfaces in another form. Therefore, modules described as separate parts may or may not be physically separate, may be located in one position, or may be distributed in different positions of a same device or different devices.

The playing device 302 receives a transport stream 301. For a source, a format, and content of the transport stream, refer to descriptions of the audio/video stream 101. Details are not described herein again.

The demultiplexing module may be, for example, a Demux or a demultiplexer. The demultiplexing module is configured to parse the received TS to obtain a video stream, subtitle data, audio data, and data of another type. It should be understood that obtained video data may be standard dynamic range (SDR) video data, static metadata HDR video data, or dynamic metadata HDR video data. In this embodiment of this application, a dynamic metadata HDR video is used as an example to describe a system for displaying a video including a subtitle.

The video decoding module may be, for example, a video decoder. For example, the video decoder may be a high efficiency video coding (HEVC) video decoder, a VP9 video decoder, a second-generation audio video coding standard (AVS2) video decoder, or a video decoder in accordance with another new coding standard that can support an HDR video in the future. The video decoder may be a software decoder or a hardware decoder. However, it should be understood that performance and power consumption of the software decoder are usually poorer than those of the hardware decoder. The video data obtained by parsing the TS is usually encoded video data. Therefore, the video decoding module is configured to decode a dynamic metadata HDR video stream obtained by parsing, to obtain HDR video data and dynamic metadata.

The subtitle parsing module may be, for example, a graphic processing module, or the graphic processing module parses the subtitle data. For example, the graphic processing module may be a software module running on a general-purpose central processing unit (CPU) or graphics processing unit (GPU), or may be a special-purpose logic circuit, or a special-purpose image signal processor (ISP). Subtitle information is included in an encapsulation format of the TS. The subtitle parsing module extracts the subtitle information from the encapsulation format of the TS. For example, the subtitle information may include subtitle text content, a codeword corresponding to the subtitle text content, and a font, a size, a color, a position, an aspect ratio, transparency, color gamut information, a bit depth, and the like of a subtitle. The codeword corresponding to the subtitle text content is described herein using an example. Chinese and English are represented by different codewords in a computer. For example, "hello" occupies 5 bytes after character encoding, "hello in Chinese" occupies 4 bytes after character encoding. The graphic processing module extracts the specific codeword corresponding to the subtitle content and sends the codeword to the encapsulation module. Then the encapsulation module packages the codeword according to a format that matches a transmission interface (or transmission channel).

Generally, the playing device 302 may further include the video/subtitle mixing module (not shown in FIG. 3). When the video data received by the playing device is the SDR video data or the static metadata HDR video data, the video/subtitle mixing module is configured to mix (or overlay) video data output by the video decoder and the subtitle information output by the subtitle parsing module, package overlaid data, and transmit the overlaid data to the display device through an HDMI. In an embodiment provided in this application, the video data and the subtitle information are not sent to the video/subtitle mixing module for mixing. Instead, the video data and the subtitle information are separately processed. For example, the video data and the subtitle information are separately encapsulated, and are separately transmitted to the display device.

The encapsulation module is configured to separately encapsulate the HDR video data (including the dynamic metadata) and the subtitle information. For example, the encapsulation module may be an HDMI transmitter. The encapsulation module encapsulates the HDR video data including the dynamic metadata into a packet that matches the HDMI and the subtitle information into a packet that matches the HDMI, and separately transmits the encapsulated packets to the display device through the HDMI. In a transmission process, the packets are directly isolated from each other. Optionally, a large amount of data is usually processed during data encapsulation. A few control configurations are completed by software, and an encapsulation process is implemented by hardware in the HDMI transmitter. Optionally, the encapsulation process may alternatively be completely completed by the software. A speed and performance of encapsulation by the software are poorer than those of encapsulation by the hardware. It should be noted that a digital channel such as the HDMI usually needs to be used to transmit video, audio, and other additional information at the same time. To ensure that different types of information can be correctly received and identified, various types of data and information need to be encapsulated and packaged according to a certain format before being transmitted. In other words, when being transmitted between the playing device and the display device, the video data and the subtitle data need to be encapsulated according to a packet format that matches the transmission interface (or transmission channel). Optionally, the HDMI transmitter encapsulates the subtitle information into an independent information frame, and sends the information frame to the display device through a transmit port of the HDMI. Optionally, the encapsulated subtitle information frame includes a type identification field and a plurality of valid subtitle information payload bytes. Optionally, the subtitle information frame further includes at least one of a version identification field or a length identification field, and a value of the length identification field is used to indicate a quantity of the plurality of valid subtitle information payload bytes. For example, valid subtitle information included in the plurality of valid subtitle information payload bytes includes at least one of the subtitle text content, the codeword corresponding to the subtitle text content, or subtitle drawing control information. The subtitle drawing control information includes at least one of the font, the size, the color, the position, the aspect ratio, the transparency, the color gamut information, the bit depth, or the like of the subtitle.

For example, Table 1 shows an encapsulation format of a subtitle information frame according to an embodiment of this application.

TABLE 1

| InfoFrame Type Code | 0XABCDEF (specific code needs to be applied for and approved) | Used to identify whether a current information frame is a subtitle information frame |
|---|---|---|
| InfoFrame Version Number | | Used to identify a version of the information frame |
| Length Of InfoFrame | N | Used to indicate a length of the information frame |
| Data Byte 1 | | First valid subtitle information payload byte |
| Data Byte 2 | | Second valid subtitle information payload byte |
| ... | | ... |
| Data Byte N | | Last valid subtitle information payload byte |

It can be learned from the table that an encapsulated information frame may include an information frame type identification field "InfoFrame Type Code". This field occupies one byte, and is used to identify that the information frame is a subtitle information frame. Specific code corresponding to this field needs to be applied for and approved. Based on this field, the transmission interface of the playing device may separately encapsulate the subtitle information into the subtitle information frame different from a video data frame, and separately send the subtitle information frame and the video data frame. A transmission interface of the corresponding display device may identify, based on this field, the received information frame as the subtitle information frame. The information frame may further include a field "InfoFrame Version Number" used to identify a version of the information frame. This field occupies one byte, and facilitates subsequent development and improvement of a subtitle information frame based on the encapsulation format. For example, a subtitle information frame format first launched is an initial version, and a new field is subsequently added to satisfy a new requirement. In this case, a version 2, a version 3, and the like may be provided. This field is used to indicate a version of the current information frame, such that the playing device and the display device perform corresponding processing based on different subtitle information frame versions. The information frame may further include a field "Length of InfoFrame" used to indicate a length of the information frame. This field occupies one byte, and is used to indicate a length of a to-be-transmitted subtitle information frame, to help preliminarily determine a size of the subtitle information frame, adjust a quantity of bytes occupied for transmitting the subtitle information frame, and improve flexibility of subtitle processing. The information frame further includes bytes "Data Byte 1" to "Data Byte N" that represent a valid subtitle information payload. Each data byte occupies one byte, and N is a quantity of the valid subtitle information payload bytes. A value of the length identification field is N, in other words, the length identification field is used to indicate the quantity of the valid subtitle information payload bytes. For example, the valid subtitle information may include the subtitle text content and the codeword corresponding to the subtitle text content, and may also include the subtitle drawing control information. For example, the subtitle drawing control information includes but is not limited to the font, the size, the color, the position, the aspect ratio, the transparency, the color gamut information, the bit depth, and the like of the subtitle. The color includes a foreground color and a background color, and the transparency includes foreground transparency and background transparency. In a possible implementation, the plurality of valid subtitle information payload bytes include a valid information flag byte, and the valid information flag byte is used to limit respective identification content of another valid subtitle information payload byte. For example, Data Byte 1 may be a valid information flag, and is used to indicate whether the current subtitle information frame includes a valid font, a valid font size, a valid foreground color, a valid background color, valid foreground transparency, valid background transparency, and valid position information. Table 2 is an example of Data Byte 1.

TABLE 2

| bit 7 | bit 6 | bit 5 | bit 4 | bit 3 | bit 2 | bit 1 | bit 0 |
|---|---|---|---|---|---|---|---|
| F0 | S0 | C0 | A0 | P0 | Reserved | Reserved | Reserved |

Meanings of the bits are as follows.

If F0 is 1, it indicates that Data Byte 3 is a valid field (the playing device specifies the subtitle font). If F0 is 0, it indicates that Data Byte 3 is an invalid field (the playing device does not specify the subtitle font, and the display device determines the font for subtitle drawing).

If S0 is 1, it indicates that Data Byte 4 is a valid field (the playing device specifies the subtitle font size). If S0 is 0, it indicates that Data Byte 4 is an invalid field (the playing device does not specify the subtitle font size, and the display device determines the font size for subtitle drawing).

If C0 is 1, it indicates that Data Byte 5 to Data Byte 7 are valid fields (the playing device specifies the subtitle foreground color). If C0 is 0, it indicates that Data Byte 5 to Data Byte 7 are invalid fields (the playing device does not specify the subtitle foreground color, and the display device determines the color for subtitle drawing).

If A0 is 1, it indicates that Data Byte 8 is a valid field (the playing device specifies the subtitle foreground transparency). If A0 is 0, it indicates that Data Byte 8 is an invalid field (the playing device does not specify the subtitle foreground transparency, and the display device determines the foreground transparency for subtitle drawing).

If P0 is 1, it indicates that Data Byte 9 to Data Byte 12 are valid fields (the playing device specifies subtitle position coordinates). If P0 is 0, it indicates that Data Byte 9 to Data Byte 12 are invalid fields (the playing device does not specify the subtitle position coordinates, and the display device determines the position coordinates for subtitle drawing).

Bit 2 to bit 0 are reserved bits. Optionally, reserved bits may be set to add new payload bytes to limit the aspect ratio, the color gamut information, and the like of the subtitle.

The following is an example limitation on each valid subtitle information payload byte.

Data Byte 2 (one byte) is used to carry a character content length. This field depends on an actual quantity of subtitle characters in the subtitle information frame, and is in a unit of byte. Optionally, if one subtitle information frame supports transmission of a maximum of 243-byte character content, a value of Data Byte 2 is 243.

Data Byte 3 (one byte): A value ranges from 0 to 255, indicating 256 different fonts.

Data Byte 4 (one byte): A value ranges from 0 to 255, indicating 256 different font sizes.

Data Byte 5 to Data Byte 7 (three bytes) indicate that different colors are used for subtitle drawing. Byte 5 is a most significant byte, and Byte 7 is a least significant byte.

Data Byte 8 (one byte): A value ranges from 0 to 255, indicating 256 different subtitle transparency levels.

Data Byte 9 and Data Byte 10 (two bytes) indicate a horizontal coordinate of the upper left corner of a subtitle in a video image. Byte 9 is a most significant byte, and Byte 10 is a least significant byte.

Data Byte 11 and Data Byte 12 (two bytes) indicates a vertical coordinate of the upper left corner of the subtitle in the video image. Byte 11 is a most significant byte, and Byte 12 is a least significant byte.

Data Byte 13 to Data Byte N indicate possible information such as subtitle text characters and punctuation marks.

It should be understood that the encapsulation format of the subtitle information frame may be extended based on an existing mechanism in an HDMI/consumer technology association (CTA) standard. The information frame encapsulation formats shown in Table 1 and Table 2 are merely examples, and do not impose a limitation on the encapsulation format.

Optionally, an HDR video packet, a dynamic metadata packet, and a subtitle packet that are transmitted through the HDMI are separately encapsulated and are isolated from each other. In this way, the three different packets or information frames can be correctly received and identified by the display device.

The HDMI transmitter separately transmits the video data frame, a dynamic metadata information frame, the subtitle information frame, and another information frame or packet to the display device. It should be understood that there are a plurality of channels in the HDMI. Some of the channels are used to transmit data information, and the other channels are used to transmit control information such as a clock signal, a check signal, a power supply signal, and a ground signal. Optionally, a data channel is time-division multiplexed, and cannot be used to transmit various packets at the same time. An amount of data transmitted through the channel in a unit time is limited by a working frequency. A maximum amount of data that can be transmitted through the channel in the unit time is bandwidth of an HDMI channel. For example, bandwidth of HDMI 2.1 is 18G bit per second (bps). Optionally, the transmission interface transmits the HDR video data frame, the dynamic metadata information frame, and the subtitle information frame in a time-division manner. Optionally, the transmission interface corresponds to a plurality of transmission frequency bands, and the transmission interface transmits the video data frame, the dynamic metadata frame, and the subtitle information frame in a frequency-division manner. Optionally, the transmission interface corresponds to a plurality of transmission channels, and the transmission interface transmits the video data frame, the dynamic metadata frame, and the subtitle information frame in a channel-division manner.

Figure 4:
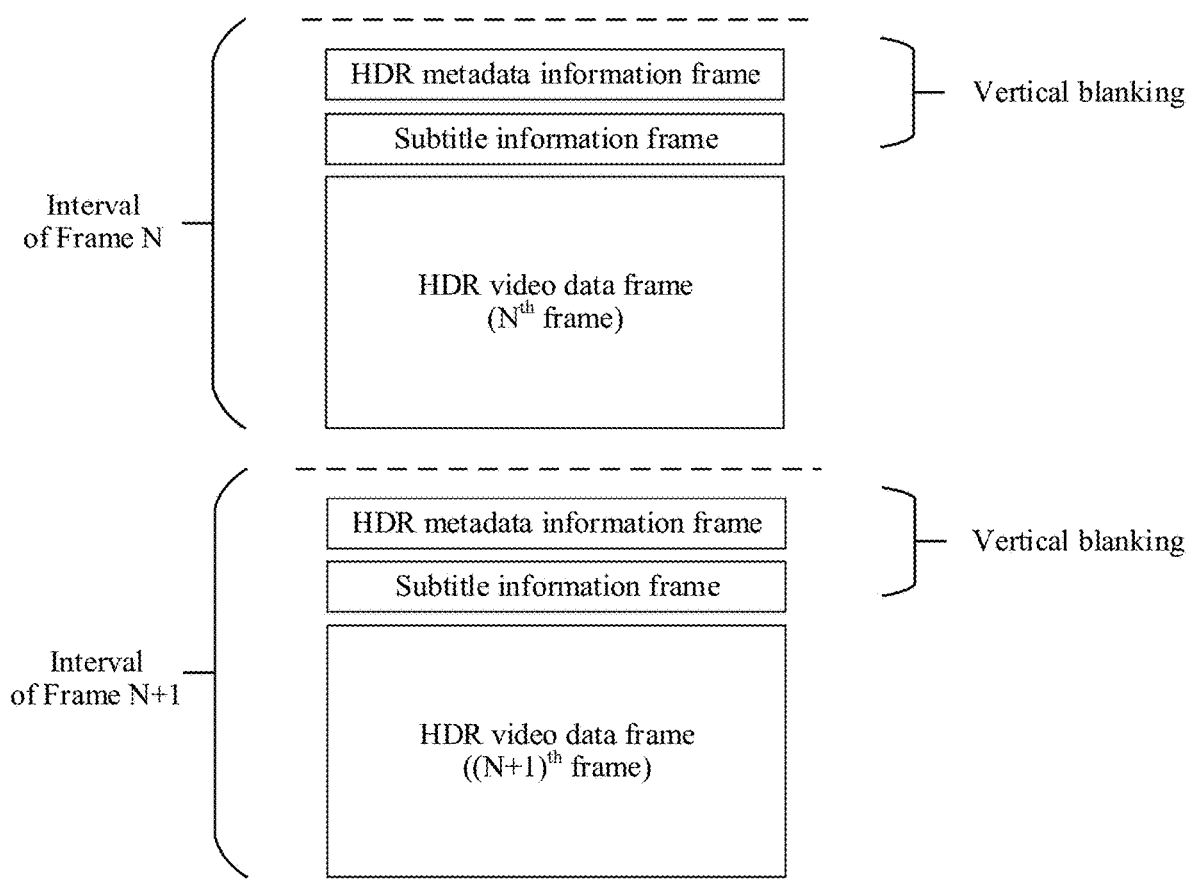
FIG. 4 is a schematic timing diagram of a transmission channel according to an embodiment of this application.

It should be understood that, in this time-division transmission manner, it needs to be ensured that image content and subtitle information of a video are synchronized in terms of time, to prevent a subtitle from being displayed before or after a dialog image. Based on a feature of frame-level aligned transmission, additional subtitle information may be encapsulated and then transmitted in an information transmission time period corresponding to an image frame matching the additional subtitle information, to ensure synchronization between an image and a subtitle. In other words, any subtitle information frame and a video data frame matching the subtitle information frame are transmitted in a same timeslot, to ensure synchronization between the image and the subtitle. Optionally, the playing device and the display device may agree on a correspondence between a subtitle information frame and a video data frame in advance. For example, the playing device and the display device may agree that an $N^{th}$ subtitle information frame received by the display device corresponds to an $N^{th}$ video data frame, or that an $(N+M)^{th}$ subtitle information frame received by the display device corresponds to an $N^{th}$ frame of video data, where M may be an integer such as ±1 or ±2. The display device matches the video data frame and the subtitle information frame based on the pre-agreed correspondence, to implement synchronization between the image and the subtitle. In addition, optionally, a frame of dynamic metadata needs to be transmitted within a specific time before or after video data corresponding to the frame of dynamic metadata is transmitted. In a compressed video stream in accordance with a standard such as efficient video coding (HEVC), dynamic metadata needs to be in a syntax structure of header information of a frame of image corresponding to the dynamic metadata. The following describes a manner of transmitting video data, metadata, and subtitle data according to an embodiment of this application. FIG. 4 is a schematic timing diagram of a transmission channel according to an embodiment of this application.

Video frames 1, 2, 3, . . . , N, N+1, . . . are sequentially transmitted through an HDMI transmission channel in chronological order. A timeslot represented by an interval in the figure is occupied for transmitting each video data frame and information related to the data frame. A timeslot for transmitting an $N^{th}$ frame of video data and information related to the data frame is "Interval of Frame N", and a timeslot for transmitting an $(N+1)^{th}$ frame of video data and information related to the data frame is "Interval of Frame N+1". The interval is related to a frame rate of a video. For example, if the frame rate is 50 frames per second, the interval is 1/50 seconds. A time interval at which two adjacent video data frames are transmitted is referred to as a vertical blanking. The time interval may be used to transmit information related to a video data frame other than the data frame, for example, transmit audio information, HDR metadata information, subtitle information, and the like. The foregoing information is provided as an information frame referred to as InfoFrame. Optionally, the information frame may be an information frame specified in a CTA standard or a private information frame provided by a vendor registered with the Institute of Electrical and Electronics Engineers (IEEE). Table 1 shows an example information frame format provided in the embodiments of this application. It should be understood that a sequence of transmitting the subtitle information frame and a metadata information frame in a transmission timeslot (in other words, in a transmission period) is not limited in this embodiment of this application. Although the subtitle information frame is transmitted after the metadata information frame in FIG. 4, optionally, the subtitle information frame may alternatively be transmitted before the metadata information frame.

It should be understood that an interface such as the HDMI can provide very high bandwidth for transmitting audio and video information in real time. However, a data amount of the subtitle information frame is far less than an amount of audio and video data. Therefore, a vertical blanking between video data frames is completely sufficient to transmit subtitle-related information.

The display device 303 receives the HDR video data frame, the dynamic metadata information frame, the subtitle information frame, and the like that are transmitted from the HDMI channel.

The decapsulation module may be, for example, an HDMI receiver. The decapsulation module decapsulates the received HDR video data frame, dynamic metadata information frame, subtitle information frame, and the like that are in the encapsulation format, to obtain the HDR video data, the dynamic metadata, and the subtitle information to facilitate subsequent processing by the display device.

The video processing module may be, for example, a video processor, or may be a special-purpose ISP or an application-specific integrated circuit. Optionally, the video processing module may alternatively be a software module running on a CPU or a GPU. The video processing module selects a proper mapping relationship based on an actual luminance range of an image frame to perform tone mapping on the HDR video data, such that different images of the dynamic metadata HDR video can be optimally displayed and presented.

The subtitle parsing module may be, for example, a graphic processing module, or the graphic processing module completes subtitle processing. For example, the graphic processing module may be a software module running on a general-purpose CPU or GPU, or may be a special-purpose logic circuit, or a special-purpose image signal processor (ISP). The subtitle processing module converts subtitle text information into an RGB image, and draws a subtitle image. The subtitle processing module may further perform tone mapping on the drawn subtitle image based on luminance of a display screen. It should be understood that the subtitle processing module performs subtitle drawing based on the size, the color, the font, and the like in the subtitle information, and ensures, during tone mapping, that a corresponding RGB value is suitable for luminance and color ranges of the screen to perform displaying.

The video and subtitle overlaying/mixing module may be, for example, a mixer in a hardware form, or may be an application-specific integrated circuit or a software module running on a general-purpose CPU or GPU. The video and subtitle overlaying/mixing module mixes/overlays a video and a subtitle that undergo tone mapping, to obtain an image frame including a subtitle. Then, the video and subtitle overlaying/mixing module sends the image frame including the subtitle to the display module for displaying. For example, the display module may be a liquid crystal display (LCD) or an organic light-emitting diode (OLED) display screen.

In this embodiment of this application, the playing device separately encapsulates the HDR video data including the dynamic metadata and the subtitle information, and separately transmits the encapsulated HDR video data and subtitle information to the display device. The display device receives the separated video data and subtitle information, performs dynamic tone mapping on the HDR video data based on the dynamic metadata, and performs, based on the actual luminance range of the screen, tone mapping on the subtitle image drawn based on the subtitle information. In this way, subtitle luminance and the subtitle color are suitable for the luminance and color ranges of the display screen. This ensures a processing effect of the HDR video and the subtitle, and prevents the subtitle luminance from being flicked or changed due to dynamic tone mapping on the HDR video data.

The foregoing describes, from a perspective of a modular functional entity, a video display system including a playing device and a display device in the embodiments of this application. The following separately describes, from a perspective of processor hardware, a playing device and a display device in the embodiments of this application.

Figure 5:
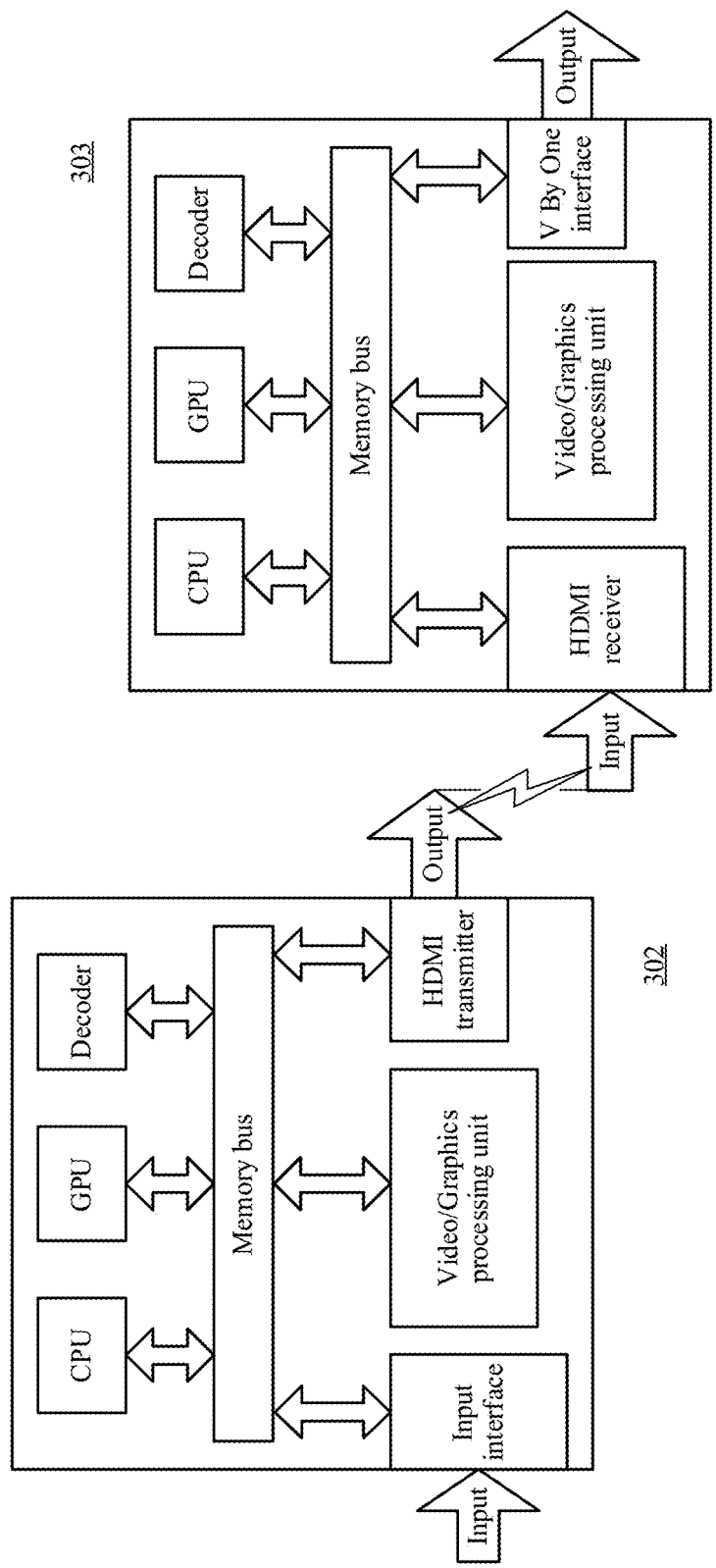
FIG. 5 is a schematic diagram of a hardware architecture of a video playing system according to an embodiment of this application.

FIG. 5 is a schematic diagram of a hardware architecture of a video playing system according to an embodiment of this application.

Optionally, a playing device 302 includes at least one central processing unit CPU, at least one memory, a GPU, a decoder, a special-purpose video/graphics processing unit, an input interface, an HDMI transmitter, and the like. Optionally, the playing device may further include a microprocessor, a microcontroller unit (MCU), and the like. Optionally, the foregoing components of the playing device are coupled using a connector. The connector may include various types of interfaces, transmission cables, buses, or the like. This is not limited in this embodiment. The connector may include various types of interfaces, transmission cables, buses, or the like. This is not limited in this embodiment. Optionally, the foregoing components are integrated into a same chip, to jointly constitute a core chip of the playing device. Alternatively, the CPU, the GPU, the decoder, the input interface, and the HDMI transmitter are integrated into one chip, and each component inside the chip accesses an external memory through a bus. The special-purpose video/graphics processing unit may be integrated into a same chip with the CPU, or may exist as an independent processor chip. The chip in this embodiment of this application is a system manufactured on a same semiconductor substrate using an integrated circuit technology, and is also referred to as a semiconductor chip. The chip may be a set of integrated circuits formed on the substrate (which is usually a semiconductor material such as silicon) using the integrated circuit technology, and an outer layer of the chip is usually packaged with a semiconductor packaging material. The integrated circuit may include various types of functional devices. Each type of functional device includes a logic gate circuit, a metal-oxide-semiconductor (MOS) transistor, or a transistor such as a bipolar transistor or a diode, and may also include another component such as a capacitor, a resistor, or an inductor. Each functional device may operate independently or operate after being driven by necessary driver software, and may implement various functions such as communication, operation, or storage.

For example, the CPU may be configured to implement some or all operations in the embodiments of this application, for example, may implement tone mapping for an image, and demultiplex and decode video data. Optionally, the CPU may be a single-core (single-CPU) processor or a multi-core (multi-CPU) processor. Optionally, the CPU may be a processor group including a plurality of processors, and the plurality of processors are coupled to each other through one or more buses. Optionally, image and video processing is partially completed by the CPU and partially completed by the special-purpose video/graphics processing unit, or may be completed by software code running on a general-purpose CPU or GPU.

The memory may be configured to store a computer program instruction, including various types of computer program code such as an operating system (OS), various user application programs, and program code used to execute the solutions of this application. The memory may be further configured to store video data, audio data, subtitle data, and the like. The CPU may be configured to execute the computer program code stored in the memory, to implement the method in the embodiments of this application. Various types of program code executed may be considered as drivers of the CPU. Optionally, the memory may be a nonvolatile memory, for example, an embedded multimedia card (EMMC), a universal flash storage (UFS), or a read-only memory (ROM); or may be another type of static storage device that can store static information and an instruction; or may be a volatile memory, for example, a random access memory (RAM), or another type of dynamic storage device that can store information and an instruction; or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other computer-readable storage medium that can be configured to carry or store program code in a form of an instruction or a data structure and can be accessed by a computer. However, the memory is not limited thereto.

The input interface is configured to receive a transport stream. The input interface of the playing device may be a network interface, for example, a WIFI or ethernet interface. The input interface may alternatively be a television broadcasting terminal, for example, a tuner. The input interface may alternatively be a universal serial bus (USB) interface.

Optionally, the CPU executes related code to demultiplex the transport stream, to obtain video data, subtitle data, and the like. The decoder decodes a video data stream to obtain video data and metadata. The video/graphics processing unit parses a subtitle. The HDMI transmitter separately encapsulates the decoded video data, metadata, and subtitle data, and transmits an encapsulated packet/information frame to a display device 303 through an HDMI data channel.

Optionally, the display device 303 includes an HDMI receiver, at least one central processing unit CPU, at least one memory, a GPU, a decoder, a special-purpose video/graphics processing unit, a V-by-One interface, and the like. The display device further includes a display screen (not shown in the figure). Optionally, the V-by-One interface is coupled to the display screen. The V-by-One interface is a digital interface standard developed for image transmission. Optionally, the display device 303 shown in FIG. 5 may be an integrated display chip, and received video data is processed by the display chip and then sent to the display screen for displaying.

For detailed descriptions of the CPU and the memory, refer to descriptions of the CPU and the memory of the playing device. Details are not described herein again. The HDMI receiver receives a packet sent by the playing device, and separately decapsulates a video packet, a metadata packet, and a subtitle information frame. Refer to descriptions of the decapsulation module. Details are not described herein again. Tone mapping may be performed on the video data by the GPU or the special-purpose video/graphics processing unit. Subtitle drawing and tone mapping can be completed by the special-purpose video/graphics processing unit or by software code running on the CPU or the GPU. It should be understood that the display device separately processes the video data and the subtitle data. Optionally, the video/graphics processing unit overlays a processed video and subtitle, and transmits an overlaid video and subtitle to the display screen through the V By One interface.

For example, the display screen may be a liquid crystal display (LCD), a light emitting diode (LED) display, an organic light-emitting diode (OLED) display screen, or a cathode ray tube (CRT) display screen.

Figure 6:
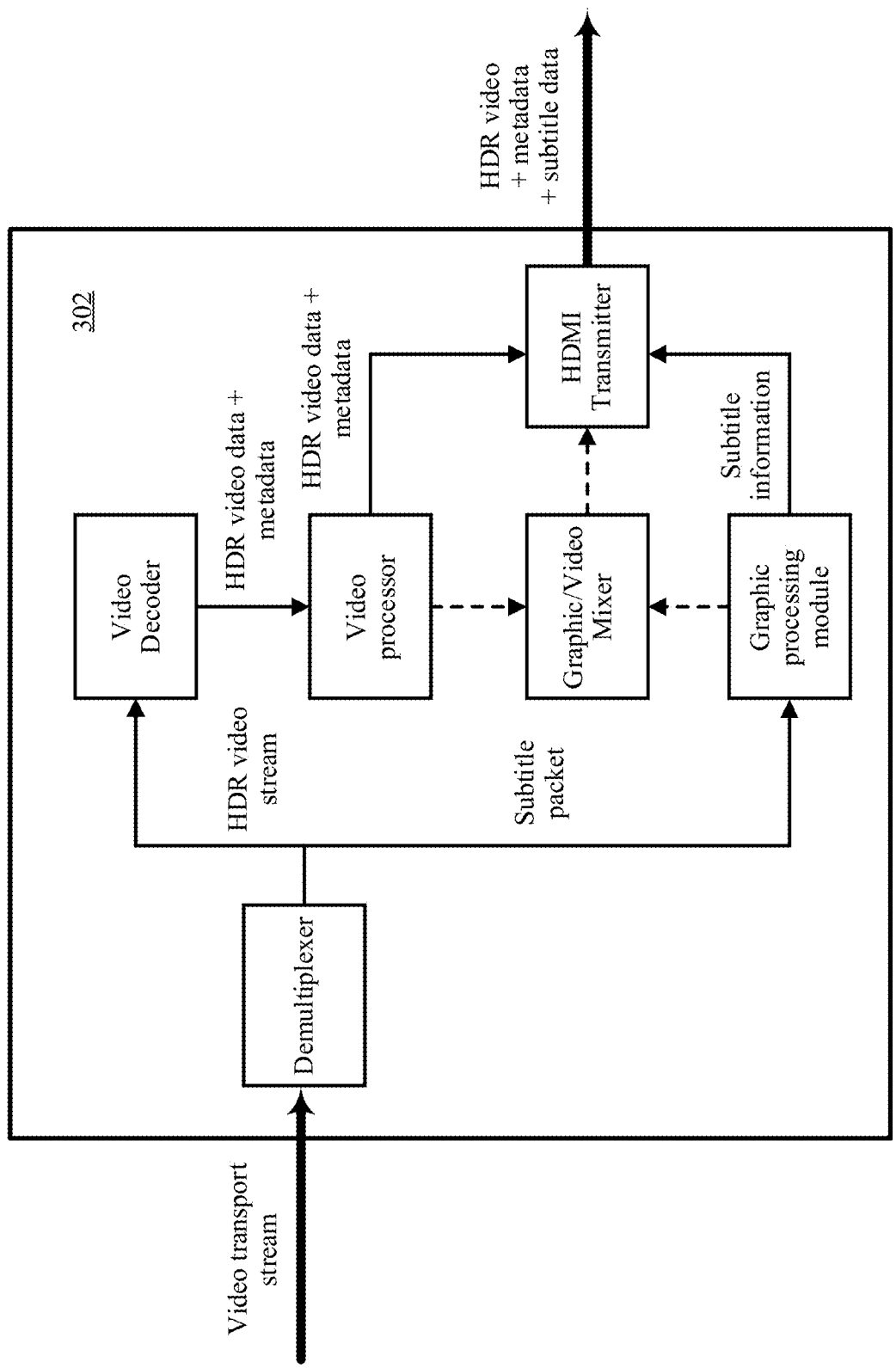
FIG. 6 is a schematic diagram of a hardware architecture of a playing device according to an embodiment of this application.

FIG. 6 is a schematic diagram of a hardware architecture of a playing device according to an embodiment of this application.

The playing device may include a demultiplexer, a video decoder, a video processor, a graphic processing module, a graphic/video mixer, an HDMI transmitter, and the like.

The demultiplexer is configured to parse a received video transport stream to obtain an HDR video stream, a subtitle packet, audio data, and data of another type. Refer to descriptions of the demultiplexing module. Details are not described herein again.

The video decoder decodes the HDR video stream to obtain HDR video data and metadata.

The video processor is configured to implement conversion between a video in each HDR format and a video in an SDR format. Optionally, the video processor may further perform scaling-up, scaling-down, denoising, or sharpening on an image in a video.

For example, the graphic processing module may be a special-purpose ISP, a special-purpose logic circuit, or a software module running on a general-purpose CPU or GPU. Subtitle information is included in an encapsulation format of the TS. For example, the subtitle information may include subtitle text content, a codeword corresponding to the subtitle text content, and a font, a size, a color, a position, an aspect ratio, color gamut information, a bit depth, and the like of a subtitle. The graphic processing module extracts the subtitle information from the encapsulation format of the TS. For details, refer to the descriptions of the subtitle parsing module. Optionally, processing performed by the graphic processing module may further include drawing an image based on the subtitle information, scaling-up, scaling-down, processing related to translucent alpha blending, and the like.

Optionally, after being mixed by the graphic/video mixer, the HDR video data (including the metadata) and the subtitle information are encapsulated by the HDMI transmitter and then sent to a display device.

Optionally, the playing device does not mix the HDR video data, the metadata, and the subtitle information, but separately sends them to the HDMI transmitter. The HDMI transmitter separately encapsulates the HDR video data, the metadata, and the subtitle information and then sends them to the display device. For a format of an encapsulated information frame, refer to descriptions of the encapsulation module. Details are not described herein again.

Figure 7:
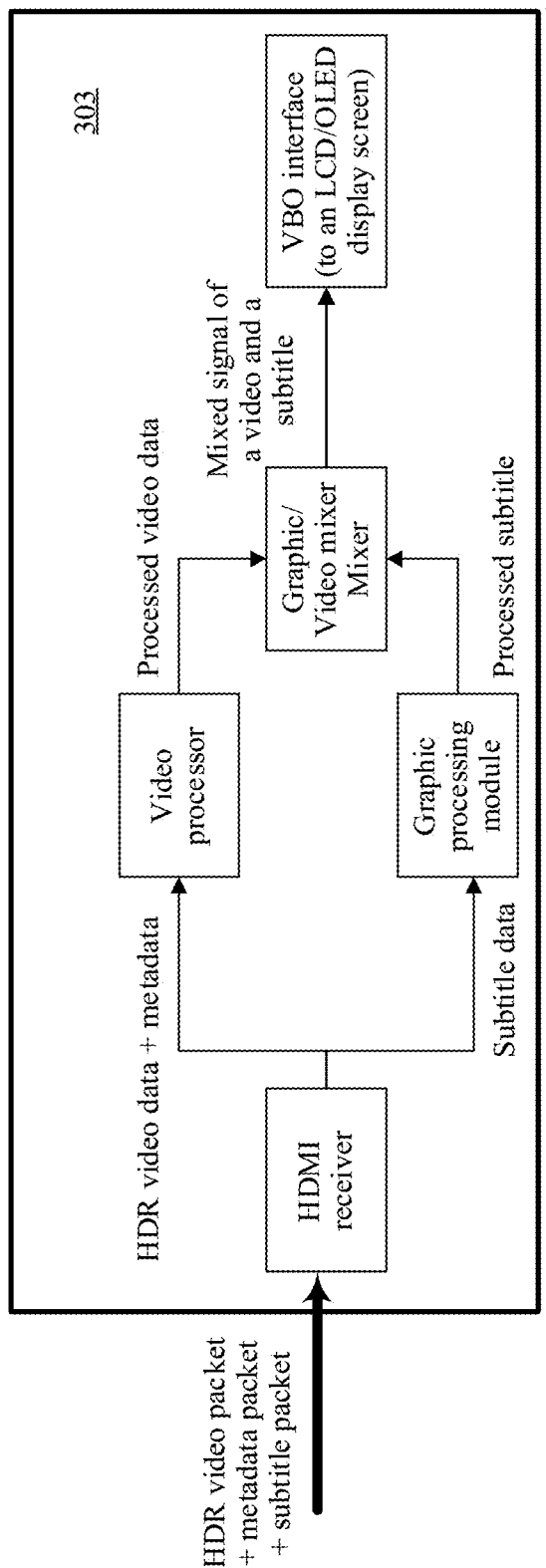
FIG. 7 is a schematic diagram of a hardware architecture of a display device according to an embodiment of this application.

FIG. 7 is a schematic diagram of a hardware architecture of a display device according to an embodiment of this application.

The display device may include an HDMI receiver, a video processor, a graphic processing module, a graphic/video mixer, a V-by-One (VBO) interface, an LCD/OLED display screen, and the like.

The HDMI receiver decapsulates a received HDR video data frame, dynamic metadata information frame, subtitle information frame, and the like that are in an encapsulation format, to obtain HDR video data, dynamic metadata, and subtitle data to facilitate subsequent processing by the display device.

The video processor may be a special-purpose ISP or an application-specific integrated circuit. The video processor selects, from a mapping relationship included in metadata, a proper mapping relationship based on an actual luminance range of an image frame to perform tone mapping on the HDR video data. In this way, different images of a dynamic metadata HDR video can be optimally displayed and presented.

The graphic processing module may be a special-purpose logic circuit, or a special-purpose ISP. The graphic processing module converts subtitle text content into an RGB image based on a font, a size, a color, a position, and the like that are indicated in subtitle information, and draws a subtitle image. The graphic processing module may further perform tone mapping on the drawn subtitle image based on luminance of the display screen.

The graphic/video mixer mixes/overlays a video and a subtitle that undergo tone mapping, to obtain an image frame including a subtitle, and sends, through the VBO interface, the image frame including the subtitle to the display screen for displaying. For a type of the display screen, refer to descriptions of the display screen in the embodiment corresponding to FIG. 5.

Figure 8:
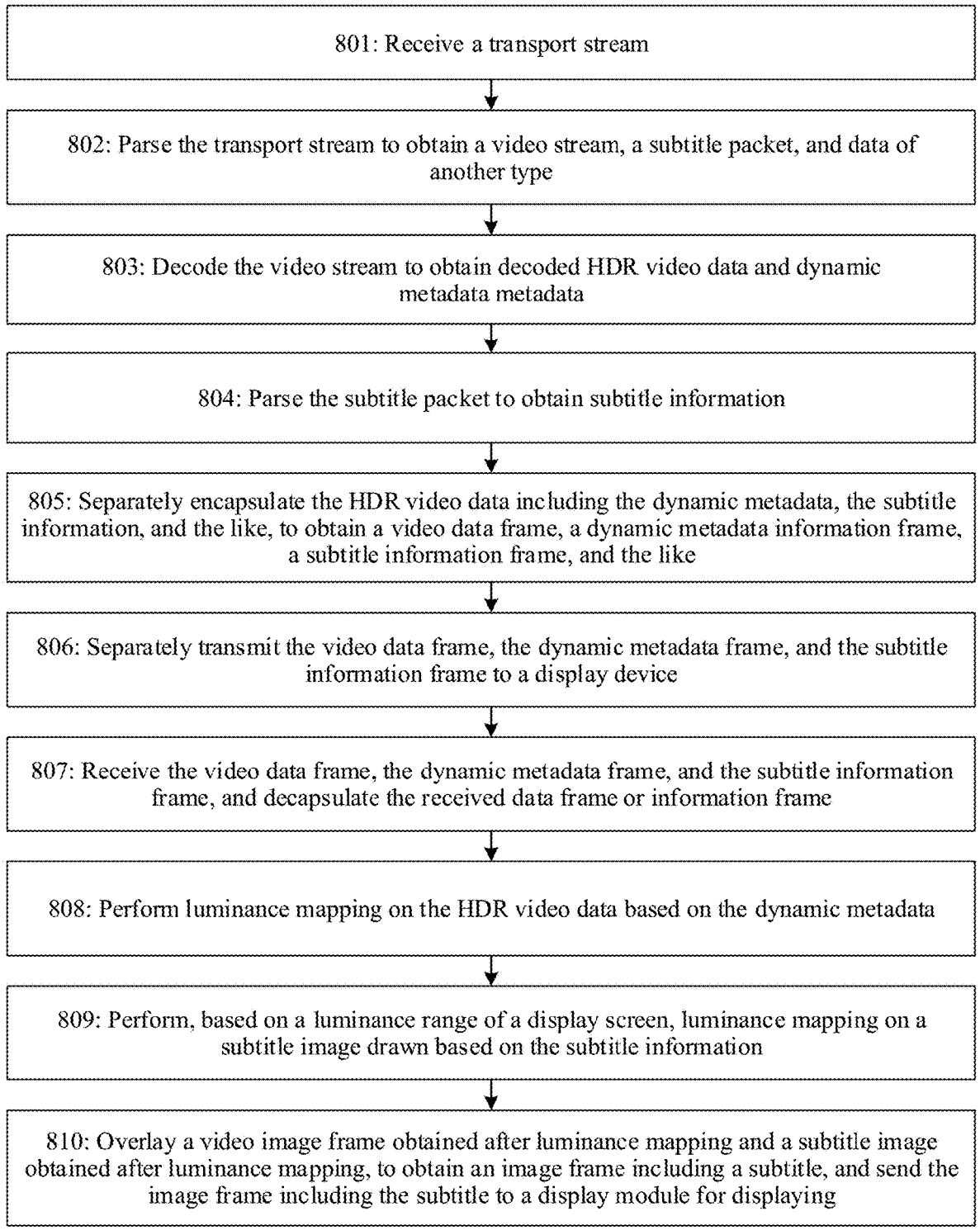
FIG. 8 is a flowchart of a method for displaying a video including a subtitle according to an embodiment of this application.

FIG. 8 is a schematic flowchart of a method for processing an HDR video including a subtitle according to an embodiment of this application. For ease of understanding, in this embodiment of this application, the video processing method is described as steps. Although the method flowchart in FIG. 8 shows a sequence of the method, in some cases, the described steps may be performed in a sequence different from the sequence herein.

Optionally, the video processing method includes a step 801 in which a transport stream is received.

For example, the transport stream may include video data, metadata, audio data, subtitle data, and the like. The video data may be SDR video data, static metadata HDR video data, dynamic metadata HDR video data, or the like. For example, the metadata usually describes content of each frame of a video image, for example, may include maximum luminance, minimum luminance, average luminance, and the like of the image. Optionally, the metadata may further include a reference mapping curve between a frame of image and a display screen. In this embodiment of this application, the video processing method is described using an example in which the video data is a dynamic metadata HDR video.

Optionally, the video processing method includes a step 802 in which the transport stream is parsed to obtain a video stream, a subtitle packet, and data of another type. For example, the data of another type includes audio data, a transport stream description table, a program mapping table, a network information table, and the like.

Optionally, the video processing method includes a step 803 in which the video stream is decoded to obtain decoded HDR video data and dynamic metadata. Optionally, both the dynamic metadata and the HDR video data are encapsulated in the video stream. After the video stream is parsed, separated HDR video data and dynamic metadata can be obtained. The metadata can be obtained without decoding the video stream.

Optionally, the video processing method includes a step 804 in which the subtitle packet is parsed to obtain subtitle information, where the subtitle information is included in the subtitle packet. It should be understood that the subtitle packet herein is a packet in a TS encapsulation format. The subtitle information may include subtitle text content, a codeword corresponding to the subtitle text content, and a font, a size, a color, a position, an aspect ratio, color gamut information, a bit depth, and the like of a subtitle.

Optionally, the video processing method includes a step 805 in which the HDR video data including the dynamic metadata and the subtitle information are separately encapsulated, to obtain a video data frame, a dynamic metadata information frame, a subtitle information frame, and the like that match a transmission interface. It should be understood that each frame of the HDR video data needs to be encapsulated, and correspondingly, the subtitle information is also encapsulated frame by frame. Each frame of the video data has subtitle information matching the frame. In other words, one frame of video data corresponds to one frame of subtitle information. A data amount of the video data frame is far greater than a data amount of the dynamic metadata information frame and a data amount of the subtitle information frame. For example, for one frame of video in a 3840×2160 422 10-bit format, data of 166 megabits need to be transmitted. However, for subtitle data including 20 Chinese characters, only 320 bits need to be transmitted. In this case, the subtitle data may account for only a few hundred thousandths of the video data. The video data frame, the dynamic metadata information frame, and the subtitle information frame are all in encapsulation formats that match the transmission interface, such that different information can be correctly received and identified by a display device. For a format of the subtitle information frame, refer to the foregoing Table 1 and related descriptions. Optionally, the transmission interface is an interface referencing a CTA related definition, for example, may be an HDMI or a display port interface.

Optionally, the video processing method includes a step 806 in which the video data frame, the dynamic metadata information frame, the subtitle information frame, and the like are separately transmitted to the display device.

Optionally, the video data frame, the dynamic metadata information frame, the subtitle information frame, and the like may be transmitted in a time-division manner using a time-division multiplexing feature of the transmission interface. Alternatively, frequency division performance may be improved, or a transmission channel may be added, to implement transmission in a channel-division manner. For example, the transmission interface corresponds to a plurality of transmission frequency bands, and the transmission interface transmits the video data frame, the dynamic metadata frame, and the subtitle information frame in a frequency-division manner. Alternatively, the transmission interface corresponds to a plurality of transmission channels, and the transmission interface transmits the video data frame, the dynamic metadata frame, and the subtitle information frame in the channel-division manner.

It should be understood that, in this separate transmission manner, it needs to be ensured that image content and subtitle information of a video are synchronized in terms of time, to prevent a subtitle from being displayed before or after a dialog image. Optionally, based on a feature of frame-level aligned transmission, additional subtitle information may be transmitted in a transmission timeslot of a video image frame matching the additional subtitle information, to ensure synchronization between an image and a subtitle. Optionally, the playing device and the display device may agree on a correspondence between a subtitle information frame and a video data frame in advance. For example, the playing device and the display device may agree that an $N^{th}$ subtitle information frame received by the display device corresponds to an $N^{th}$ video data frame, or that an $(N+M)^{th}$ subtitle information frame received by the display device corresponds to an $N^{th}$ frame of video data, where M may be an integer such as ±1 or ±2. The display device matches the video data frame and the subtitle information frame based on the pre-agreed correspondence, to implement synchronization between the image and the subtitle. In addition, optionally, a frame of dynamic metadata needs to be transmitted within a specific time before or after video data corresponding to the frame of dynamic metadata is transmitted. In a compressed video stream in accordance with a standard such as HEVC, dynamic metadata needs to be in a syntax structure of header information of a frame of image corresponding to the dynamic metadata. For an example of separate transmission, refer to FIG. 4 and descriptions corresponding to FIG. 4.

Optionally, the video processing method includes a step 807 in which the video data frame, the dynamic metadata information frame, and the subtitle information frame are received, and the received data frame or information frame is separately decapsulated to obtain the HDR video data, the dynamic metadata, and the subtitle information to facilitate subsequent processing by the display device.

The video processing method includes a step 808 in which tone mapping is performed on the HDR video data based on the dynamic metadata.

It should be understood that the dynamic metadata includes a plurality of mapping relationships. A proper mapping relationship is selected based on an actual luminance range of an HDR video image frame to perform tone mapping on the HDR video image frame, such that different images of the dynamic metadata HDR video can be optimally displayed and presented.

The video processing method includes a step 809 in which based on a luminance range of the display screen, tone mapping is performed on a subtitle image drawn based on the subtitle information.

It should be understood that the subtitle information includes the subtitle text content and indication information. The indication information includes but is not limited to the font, the size, the color, the position, the bit depth, and the like of the subtitle. The subtitle image is drawn based on the subtitle text content and the indication information in the subtitle information. Optionally, the subtitle image is an RGB image. Tone mapping is performed on the subtitle image based on range of luminance that can be displayed by the display screen to ensure that a corresponding RGB value is suitable for luminance and color ranges of the screen.

Optionally, the video processing method includes a step 810 in which HDR video data obtained after tone mapping and a subtitle image obtained after tone mapping are overlaid to obtain a video image including a subtitle, and the video image including the subtitle is displayed.

In this embodiment of this application, the HDR video data including the dynamic metadata and the subtitle information are separately encapsulated and are separately transmitted to the display device. The display device receives the separated video data and subtitle information, performs dynamic tone mapping on the HDR video data based on the dynamic metadata, and performs, based on the actual luminance range of the screen, tone mapping on the subtitle image drawn based on the subtitle information. In this way, subtitle luminance and the subtitle color are suitable for the luminance and color ranges of the display screen. This ensures a processing effect of the HDR video and the subtitle, and improves a subtitle display effect of the dynamic metadata HDR video.

Figure 9:
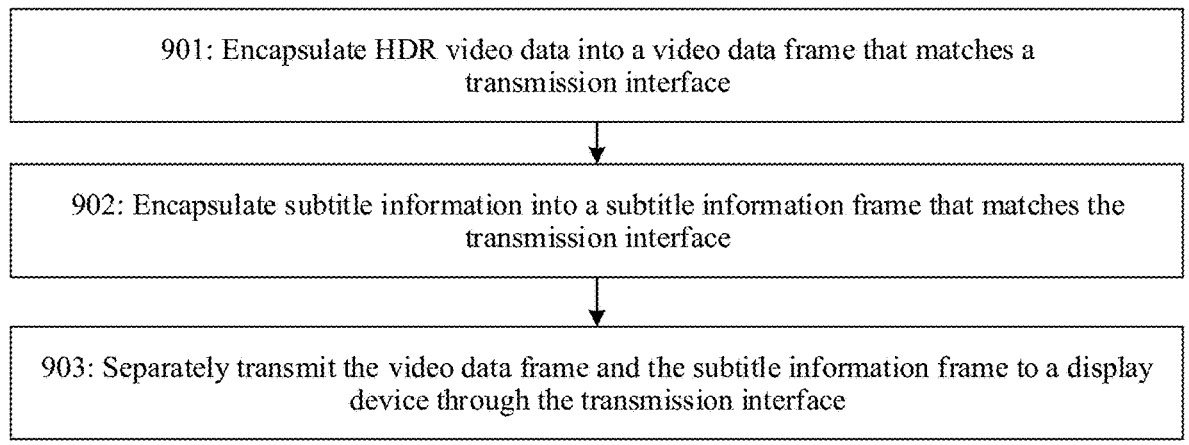
FIG. 9 is a flowchart of another method for displaying a video including a subtitle according to an embodiment of this application.

FIG. 9 is a schematic flowchart of another method for processing an HDR video including a subtitle according to an embodiment of this application.

For ease of understanding, in this embodiment of this application, the video processing method is described as steps. Although the method flowchart in FIG. 9 shows a sequence of the method, in some cases, the described steps may be performed in a sequence different from the sequence herein.

The method includes the following steps.

Step 901: Encapsulate HDR video data into a video data frame that matches a transmission interface.

Step 902: Encapsulate subtitle information into a subtitle information frame that matches the transmission interface.

Step 903: Separately transmit the video data frame and the subtitle information frame to a display device through the transmission interface.

Optionally, the transmission interface may be time-division multiplexed, and the transmission interface transmits the video data frame and the subtitle information frame in a time-division manner. Optionally, the transmission interface corresponds to a plurality of transmission frequency bands, and the transmission interface transmits the video data frame and the subtitle information frame in a frequency-division manner. Optionally, the transmission interface corresponds to a plurality of transmission channels, and the transmission interface transmits the video data frame and the subtitle information frame in a channel-division manner. Optionally, the transmission interface may be an HDMI, a display port interface, or another interface referencing a CTA related definition. For details, refer to the foregoing related descriptions of the encapsulation module of the playing device. It should be understood that the subtitle information frame and the video data frame are packets in two types of formats. For a format of the subtitle information frame, refer to Table 1, Table 2, and related descriptions. For separate transmission of the subtitle information frame and the video data frame, refer to FIG. 4 and corresponding descriptions.

Optionally, the method further includes: receiving a transport stream. The transport stream includes the HDR video data, the subtitle information, and metadata, where the metadata includes a mapping relationship for performing tone mapping on the HDR video data.

Optionally, the method further includes: encapsulating the metadata into a metadata information frame that matches the transmission interface.

The video data frame, the subtitle information frame, and the metadata information frame are separately transmitted to the display device through the transmission interface. Optionally, the subtitle information frame and the metadata information frame are transmitted within a vertical blanking of a corresponding transmission timeslot of the video data frame. The subtitle information frame is transmitted before or after the metadata.

In this embodiment of this application, the HDR video data including dynamic metadata and the subtitle information are separately encapsulated and are separately transmitted to the display device. In this way, the display device can obtain the separated video content and subtitle information, and then separately perform corresponding processing on an HDR video and a subtitle. This improves a subtitle display effect of a dynamic metadata HDR video.

An embodiment of this application further provides a computer-readable storage medium. The computer-readable storage medium stores an instruction. When the instruction is run on a computer, the computer is enabled to perform one or more steps of any one of the foregoing methods. When component modules are implemented in a form of a software functional unit and sold or used as an independent product, the component modules may be stored in the computer-readable storage medium.

Based on such an understanding, an embodiment of this application further provides a computer program product including an instruction. The technical solutions of this application essentially, or the part contributing to other approaches, or all or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in the embodiments of this application. For a type of the storage medium, refer to related descriptions of the memory.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application. For example, for some operations in the apparatus embodiment, refer to the foregoing method embodiments.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for processing a high dynamic range (HDR) video comprising a subtitle, wherein the method comprises:
   receiving a transport stream, wherein the transport stream comprises HDR video data, subtitle information, and metadata, and wherein the metadata comprises a mapping relationship for performing tone mapping on the HDR video data;
   encapsulating the HDR video data into a video data frame that matches a transmission interface;
   encapsulating the subtitle information into a subtitle information frame that matches the transmission interface;
   encapsulating the metadata into a metadata information frame that matches the transmission interface;
   separately transmitting the video data frame, the subtitle information frame, and the metadata information frame to a display device through the transmission interface; and
   transmitting video data frames sequentially through the transmission interface in chronological order, wherein an $N^{th}$ video data frame is transmitted in an $N^{th}$ timeslot, wherein an $N^{th}$ subtitle information frame corresponding to the $N^{th}$ video data frame is transmitted within a vertical blanking of the $N^{th}$ timeslot, wherein N is a positive integer, and wherein the video data frame and the subtitle information frame are packets in two types of formats.

2. The method according to claim 1, wherein separately transmitting the video data frame and the subtitle information frame comprises transmitting the video data frame and the subtitle information frame to the display device through the transmission interface in a time-division manner.

3. The method according to claim 1, wherein transmitting the subtitle information frame comprises transmitting the subtitle information frame within a vertical blanking, and wherein the vertical blanking is a time interval at which two adjacent video data frames are transmitted.

4. The method according to claim 1, wherein separately transmitting the video data frame and the subtitle information frame comprises:
transmitting the video data frame and the subtitle information frame to the display device through the transmission interface in a frequency-division manner when the transmission interface corresponds to a plurality of transmission frequency bands; or
transmitting the video data frame and the subtitle information frame to the display device through the transmission interface in a channel-division manner when the transmission interface corresponds to a plurality of transmission channels.

5. The method according to claim 4, further comprising transmitting, within the vertical blanking of the $N^{th}$ timeslot, an $N^{th}$ metadata information frame corresponding to the $N^{th}$ video data frame.

6. A method for processing a high dynamic range (HDR) video comprising subtitles, wherein the method comprises:
separately receiving, through a transmission interface, a video data frame, and a subtitle information frame from a playing device;
receiving a metadata information frame through the transmission interface;
decapsulating the video data frame to obtain HDR video data;
decapsulating the subtitle information frame to obtain subtitle information;
decapsulating the metadata information frame to obtain metadata, wherein the metadata comprises a mapping relationship for performing tone mapping on the HDR video data;
separately performing tone mapping on the HDR video data and a subtitle image, wherein the subtitle image is drawn based on the subtitle information; and
obtaining a video image by overlaying the HDR video data and the subtitle image after the HDR video data and the subtitle image are tone mapped, wherein the video image comprises a subtitle, and wherein separately performing tone mapping on the HDR video data and the subtitle image comprises:
performing tone mapping on the HDR video data based on the metadata; and
performing tone mapping on the subtitle image based on a range of luminance that can be displayed by a display device.

7. The method according to claim 6, wherein separately receiving the video data frame and the subtitle information frame comprises receiving, through the transmission interface in a time-division manner, the video data frame and the subtitle information frame from the playing device.

8. The method according to claim 6, wherein the subtitle information frame is received within a vertical blanking, and wherein the vertical blanking is a time interval at which two adjacent video data frames are transmitted.

9. The method according to claim 6, wherein separately receiving the video data frame and the subtitle information frame from the playing device comprises:
receiving the video data frame and the subtitle information frame through the transmission interface in a frequency-division manner when the transmission interface corresponds to a plurality of transmission frequency bands; or
receiving the video data frame and the subtitle information frame through the transmission interface in a channel-division manner when the transmission interface corresponds to a plurality of transmission channels.

10. An apparatus for playing a high dynamic range (HDR) video comprising a subtitle, wherein the apparatus comprises:
a transmission interface; and
a processor coupled to the transmission interface and configured to:
receive a transport stream, wherein the transport stream comprises HDR video data, subtitle information, and metadata, and wherein the metadata comprises a mapping relationship for performing tone mapping on the HDR video data;
encapsulate the HDR video data into a video data frame that matches the transmission interface;
encapsulate the subtitle information into a subtitle information frame that matches the transmission interface; and
encapsulate the metadata into a metadata information frame that matches the transmission interface,
wherein the transmission interface is configured to
separately transmit the video data frame, the subtitle information frame, and the metadata information frame to a display device; and
transmit, within the vertical blanking of an $N^{th}$ timeslot in which an $N^{th}$ video data frame is transmitted, an $N^{th}$ metadata information frame corresponding to the $N^{th}$ video data frame to the display device, wherein N is a positive integer, and wherein the video data frame and the subtitle information frame are packets in two types of formats.

11. The apparatus according to claim 10, wherein the transmission interface is further configured to transmit the video data frame and the subtitle information frame to the display device in a time-division manner.

12. The apparatus according to claim 10, wherein the subtitle information frame is transmitted within a vertical blanking, and wherein the vertical blanking is a time interval at which two adjacent video data frames are transmitted.

13. The apparatus according to claim 10, wherein the transmission interface is further configured to:
transmit the video data frame and the subtitle information frame to the display device in a frequency-division manner; or
transmit the video data frame and the subtitle information frame to the display device in a channel-division manner.

14. A display apparatus for displaying a high dynamic range (HDR) video comprising subtitles, wherein the display apparatus comprises:
a receiving interface configured to:
separately receive a video data frame and a subtitle information frame from a playing device;
receive a metadata information frame; and
a processor configured to:
decapsulate the video data frame to obtain HDR video data;
decapsulate the subtitle information frame to obtain subtitle information;
decapsulate the metadata information frame to obtain metadata, wherein the metadata comprises a mapping relationship for performing tone mapping on the HDR video data;
perform tone mapping on the HDR video data based on the metadata;

perform tone mapping on a subtitle image based on a range of luminance that can be displayed by a display device, wherein the subtitle image is drawn based on the subtitle information; and obtain a video image by overlaying the HDR video data and the subtitle image after the HDR video data and the subtitle image are tone mapped, wherein the video image comprises a subtitle.

15. The display apparatus according to claim 14, wherein the receiving interface is further configured to receive, in a time-division manner, the video data frame and the subtitle information frame from the playing device.

16. The display apparatus according to claim 14, wherein the subtitle information frame is transmitted within a vertical blanking, and wherein the vertical blanking is a time interval at which two adjacent video data frames are transmitted.

17. The display apparatus according to claim 14, wherein video data frames are sequentially received through the receiving interface in chronological order, wherein an $N^{th}$ video data frame is transmitted in an $N^{th}$ timeslot, wherein an $N^{th}$ subtitle information frame corresponding to the $N^{th}$ video data frame is transmitted within a vertical blanking of the $N^{th}$ timeslot, and wherein N is a positive integer.

18. The display apparatus according to claim 17, wherein an $N^{th}$ metadata information frame corresponding to the $N^{th}$ video data frame to the display device is transmitted within the vertical blanking of the Nth timeslot.

* * * * *